UNITED STATES PATENT OFFICE.

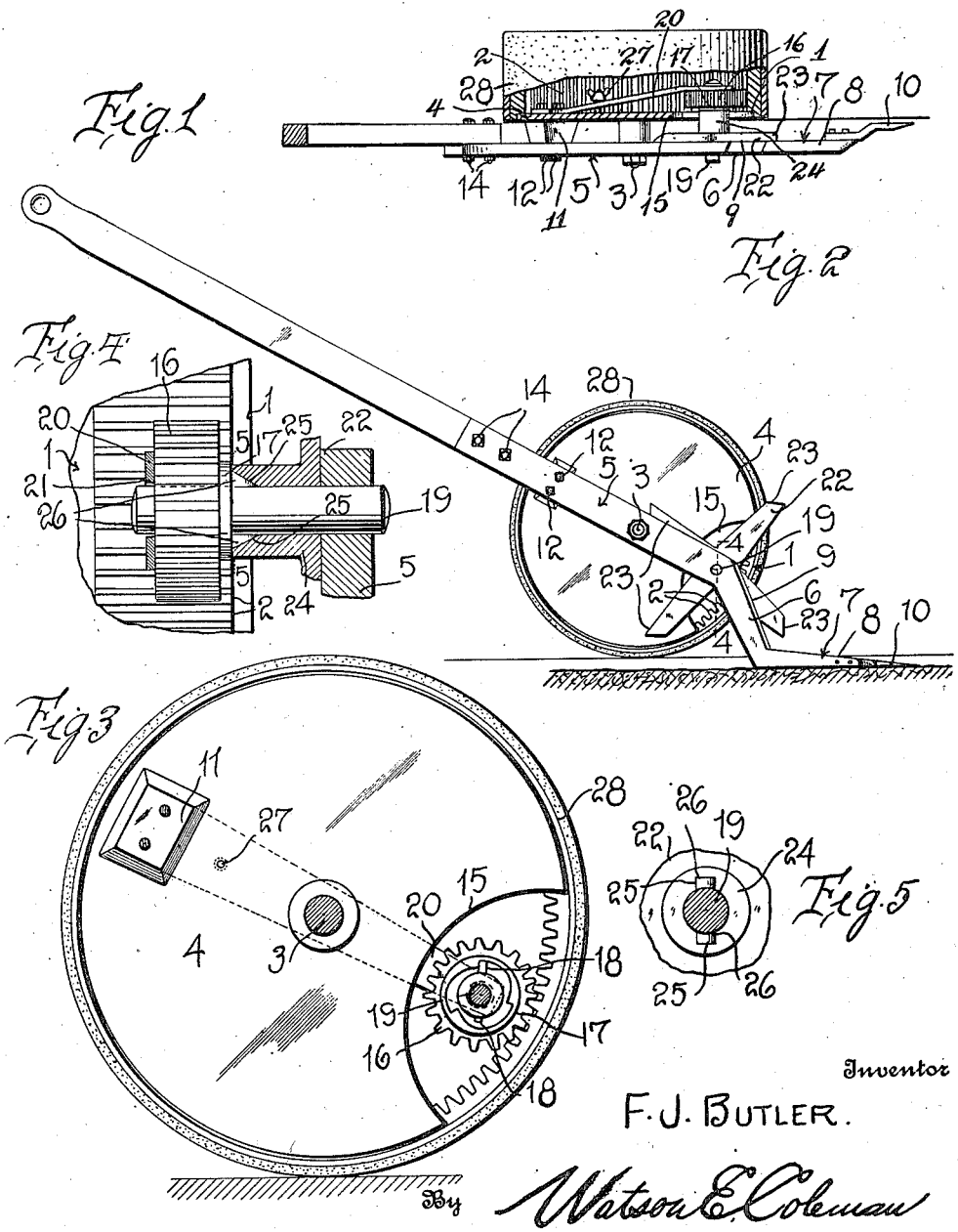

FRED J. BUTLER, OF ENID, OKLAHOMA.

LAWN-TRIMMER.

1,169,002.  Specification of Letters Patent.  Patented Jan. 18, 1916.

Application filed October 20, 1915. Serial No. 56,954.

*To all whom it may concern:*

Be it known that I, FRED J. BUTLER, a citizen of the United States, residing at Enid, in the county of Garfield and State of Oklahoma, have invented certain new and useful Improvements in Lawn-Trimmers, of which the following is a specification, reference being had to the accompanying drawings.

This invention relates to certain improvements in lawn trimmers, and it is an object of the invention to provide a device of this general character having novel and improved means whereby a lawn may be readily and conveniently trimmed along path ways, curbings or the like.

It is also an object of the invention to provide a novel and improved lawn trimmer including a stationary cutter and a rotatable cutter adapted for coaction when the device is caused to travel over a surface; and it is a further object to provide a device of this general character with means whereby the grass will be properly fed or delivered to the cutters.

The invention consists in the details of construction and in the combination and arrangement of the several parts of my improved lawn trimmer whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in top plan of a lawn trimmer constructed in accordance with an embodiment of my invention, the coacting operating handle being shown in fragment; Fig. 2 is a view in side elevation of the device as herein embodied; Fig. 3 is an enlarged view, partly in side elevation and partly in section, illustrating my invention as herein disclosed; Fig. 4 is an enlarged fragmentary sectional view illustrating certain details of my present invention; and Fig. 5 is a fragmentary sectional view disclosing a detail of the mounting of the rotary cutter.

As disclosed in the accompanying drawings, 1 denotes a traction wheel of predetermined dimensions and having its rim provided with an annular series of inwardly disposed teeth 2 and the wheel 1 is rotatably mounted upon the stub shaft 3 disposed through the grass plate 4 and the bar 5. The grass plate 4 is substantially circular in form and is adapted to be snugly positioned within the rim of the wheel 1 and serves to prevent grass or the like from clogging or otherwise interfering with the teeth 2.

The bar 5 is of a length in excess of the diameter of the wheel 1 and its lower extremity is offset laterally and downwardly as at 6, and terminates in the forwardly disposed extension 7, the upper edge of the extension 7 being arranged on a forward and downward incline, as indicated at 8, so that the grass will be properly directed or fed to the knife edge 9 formed along the forward margin of the offset portion 6. I also find it of advantage to have detachably engaged with the forward or free extremity of the extension 7 the pointed member 10 which serves to positively assure the requisite elevation of the grass to be trimmed and said pointed member is preferably made of steel so that it may readily and effectively enter the soil when the requirements of practice may so necessitate.

The face of the grass plate 4 adjacent the bar 5 and at a point above the shaft 3 is provided with a lug 11 with which the bar 5 is secured, as indicated at 12, and the upper extended portion of the bar 5, as indicated at 14, is suitably secured to an operating handle of conventional form. It will be perceived that the connection between the bar 5 and the plate 4 will result in a movement of the plate 4 independently of the wheel 1 when the bar 5 is rocked.

Adjacent the junction between the bar 5 and the extension 6, the plate 4 is provided with a segmental recess 15 to permit the pinion 16 to operatively engage the teeth 2 of the wheel 1. As herein disclosed, the pinion 16 is provided with the ratchet hub 17 with which coact the radially movable pawls 18 carried by the stub shaft 19 on which the pinion 16 is rotatably mounted. The shaft 19 is carried by the bar 5 and is positioned at the junction between the bar 5 and the extension 6. The shaft 19 is also disposed inwardly of the wheel 1.

Secured to the inner face of the plate 4 and disposed diametrically thereacross is a flat spring 20, one extremity of which being provided with an opening 21 for the passage therethrough of the stub shaft 19 and said spring 20 serves to force the rotary cutter 22 mounted upon the stub shaft 19 against the bar 5 so that the cutting blades 23 comprised in said cutter will effectively coact with the cutting or knife edge 9 of the extension 6 of the bar 5. The hub 24 of the cutter 22 is provided with the inner grooves 25 adapted to receive the lugs 26 carried by the stub shaft 19 whereby the cutter will be effectively keyed to said shaft 19 and maintained in such relation under the influence of the tension of the flat spring 20. It is to be observed that the inner end of the spring 20 is anchored to the inner face of the plate 4 and that the spring has disposed therethrough the set screw 27 threaded into the plate 4 whereby the tension of the spring 20 may be regulated.

In practice, I find it of advantage to provide the rim of the wheel 1 with a rubber tire 28, although this is not essential to the successful operation of the device.

From the foregoing description, it is thought to be obvious that a lawn trimmer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A lawn trimmer comprising a substantially vertically disposed bar having its forward margin provided with a cutting edge, a traction wheel rotatably supported by the bar, a rotary cutter carried by the bar and coacting with the cutting edge thereof, an operative connection between the cutter and wheel, a plate interposed between the bar and wheel and secured to said bar, said plate snugly fitting within the rim of the wheel, and a flat spring anchored to the plate and bearing against the rotary cutter for urging the same toward the bar.

2. A lawn trimmer comprising a substantially vertically disposed bar having its forward margin provided with a cutting edge, a traction wheel rotatably supported by the bar, a rotary cutter carried by the bar and coacting with the cutting edge thereof, an operative connection between the cutter and wheel, a plate interposed between the bar and wheel and secured to said bar, said plate snugly fitting within the rim of the wheel, a flat spring anchored to the plate and bearing against the rotary cutter for urging the same toward the bar, and means for regulating the tension of the flat spring.

In testimony whereof I hereunto affix my signature in the presence of two witnesses.

FRED J. BUTLER.

Witnesses:
  F. J. PRATT,
  CHAS. CHURCH.